(12) United States Patent
Dontha et al.

(10) Patent No.: US 9,000,706 B2
(45) Date of Patent: Apr. 7, 2015

(54) ACTUATOR CONTROL SYSTEM

(71) Applicant: Cummins Inc., Columbus, IN (US)

(72) Inventors: Ramakrishna Dontha, Columbus, IN (US); Daniel E. Boewe, Columbus, IN (US); Niraj Desai, Columbus, IN (US); Hari Donepudi, Columbus, IN (US); Mike Menkedick, Greensburg, IN (US)

(73) Assignee: Cummins Inc., Columbus, IN (US)

( * ) Notice: Subject to any disclaimer, the term of this patent is extended or adjusted under 35 U.S.C. 154(b) by 151 days.

(21) Appl. No.: 13/738,202

(22) Filed: Jan. 10, 2013

(65) Prior Publication Data

US 2013/0181648 A1  Jul. 18, 2013

Related U.S. Application Data

(60) Provisional application No. 61/586,549, filed on Jan. 13, 2012.

(51) Int. Cl.
*H02P 7/00* (2006.01)
*H02P 29/02* (2006.01)
*H02P 6/04* (2006.01)

(52) U.S. Cl.
CPC ............... *H02P 7/00* (2013.01); *H02P 29/028* (2013.01); *H02P 2006/045* (2013.01)

(58) Field of Classification Search
USPC .......... 318/139, 430, 434, 254, 560, 561, 721
See application file for complete search history.

(56) References Cited

U.S. PATENT DOCUMENTS

| | | | |
|---|---|---|---|
| 4,952,853 A | 8/1990 | Archer | |
| 5,350,988 A | 9/1994 | Le | |
| 6,012,437 A * | 1/2000 | Radhamohan et al. | 123/568.23 |
| 6,472,784 B2 | 10/2002 | Miekka et al. | |
| 6,614,195 B2 * | 9/2003 | Bushey et al. | 318/135 |
| 6,700,342 B2 * | 3/2004 | Hampo et al. | 318/432 |
| 6,777,838 B2 | 8/2004 | Miekka et al. | |
| 6,982,534 B2 | 1/2006 | Hahn et al. | |
| 7,023,163 B2 * | 4/2006 | Charles et al. | 318/563 |
| 7,065,437 B2 * | 6/2006 | Mir et al. | 701/41 |
| 7,248,009 B1 * | 7/2007 | Sundquist | 318/434 |
| 7,276,878 B2 | 10/2007 | Phillips et al. | |
| 7,315,109 B1 * | 1/2008 | Griffiths et al. | 310/300 |
| RE41,036 E * | 12/2009 | Bushey et al. | 318/135 |
| 8,358,093 B1 * | 1/2013 | Allison, III | 318/400.35 |
| 8,358,095 B2 * | 1/2013 | Savagian et al. | 318/490 |
| 2003/0030395 A1 * | 2/2003 | Hampo et al. | 318/432 |
| 2003/0042858 A1 * | 3/2003 | Weinbrenner | 318/139 |
| 2004/0179829 A1 * | 9/2004 | Phillips et al. | 388/804 |
| 2005/0043873 A1 * | 2/2005 | Mir et al. | 701/41 |
| 2005/0127854 A1 * | 6/2005 | Charles et al. | 318/109 |
| 2006/0119300 A1 * | 6/2006 | Armstrong | 318/254 |
| 2006/0166519 A1 | 7/2006 | Telep et al. | |
| 2006/0227488 A1 | 10/2006 | Dimig et al. | |
| 2007/0019933 A1 * | 1/2007 | Phillips et al. | 388/804 |
| 2008/0303619 A1 | 12/2008 | Viitanen et al. | |
| 2010/0253250 A1 | 10/2010 | Marvelly et al. | |
| 2011/0015788 A1 | 1/2011 | Celik et al. | |
| 2011/0025247 A1 * | 2/2011 | Savagian et al. | 318/490 |

* cited by examiner

*Primary Examiner* — Paul Ip
(74) *Attorney, Agent, or Firm* — Krieg DeVault LLP

(57) ABSTRACT

A system comprising an actuator and a controller configured to drive the actuator with a pulse width modulated (PWM) signal. The controller is configured to limit a duty cycle of the PWM signal in response to a current supplied by the PWM signal.

12 Claims, 3 Drawing Sheets

ACTUATOR CONTROL SYSTEM

CROSS-REFERENCE TO RELATED APPLICATIONS

The present application claims the benefit of the filing date of provisional application Ser. No. 61/586,549 filed on Jan. 13, 2012, which is incorporated herein by reference.

FIELD OF THE INVENTION

Embodiments relate to actuator control systems and, in particular, to actuator control systems for engines.

BACKGROUND

Electric actuators can be used to actuate components of an engine of a vehicle. Electric motors can be used to actuate throttles, steering components, various mechanical linkages, or the like. Electrical systems using such components can have varying specifications, such as power supply voltages. To accommodate such different systems different electrical actuators designed for the different supply voltages can be used, increasing production and maintenance costs.

DETAILED DESCRIPTION

Figure 1:
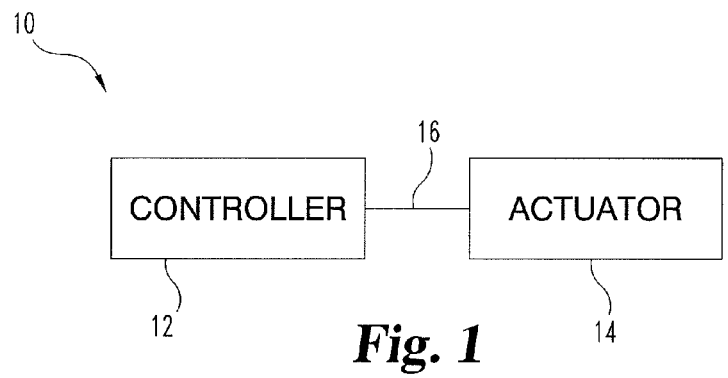
FIG. 1 is a block diagram of an actuator control system according to an embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated herein.

FIG. 1 is a block diagram of an actuator control system according to an embodiment. In this embodiment, the actuator control system 10 includes a controller 12 and an actuator 14. The controller 12 is configured to drive the actuator 14 with a pulse width modulated (PWM) signal 16. In particular, the controller can be configured to limit a duty cycle of the PWM signal 16

The controller 12 can be any variety of controller. For example, the controller 12 can be a dedicated controller solely for controlling the actuator. In another example, the controller 12 can be part of a larger control system, such as an engine control system. The controller 12 can be implemented in a variety of ways. For example, the controller 12 can include a general purpose processor, a programmable logic device, an application specific integrated circuit, discrete components, a digital signal processor, a combination of such devices, or the like. Moreover, the controller 12 can, but need not be a single device. That is, the controller 12 can include multiple distributed components.

The actuator 14 can be any actuator that can be driven by a PWM signal. For example, the actuator 14 can be a brushless direct current (BLDC) motor. In another example, the actuator 14 can be a solenoid. In another example, the actuator 14 can be a linear motor. In an embodiment, any device that is controlled by applying a current to generate a magnetic field that interacts with another magnetic field can be used as the actuator 14.

Figure 2:
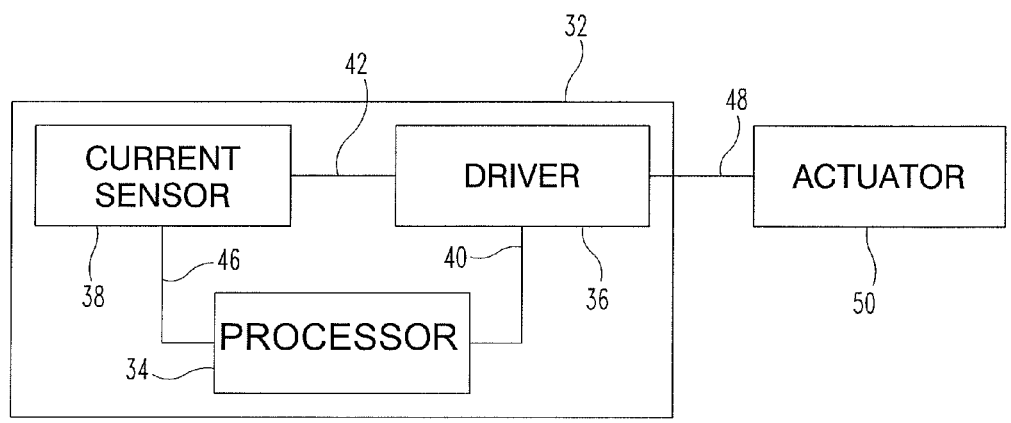
FIG. 2 is a block diagram of an actuator control system according to another embodiment.

FIG. 2 is a block diagram of an actuator control system according to another embodiment. In this embodiment, the actuator control system 30 includes a controller 32 coupled to an actuator 50. The controller 32 includes a processor 34, a driver 36, and a current sensor 38.

The driver 36 is configured to drive the actuator 50 using a PWM signal 48. The driver 48 is configured to generate the PWM signal 48 in response to a PWM signal 40 from the processor 34. For example, the driver 36 can include multiple transistors that switch in response to the PWM signal 40. Thus, the PWM signal 48 can be a signal that provides the power to actuate the actuator 50.

Using a BLDC motor as an example, the PWM signal 48 can be multiple signals for multiple phases associated with the BLDC motor. That is, the PWM signal 48 can include multiple individual PWM signals, each phased differently. Coils of the BLDC motor are powered by the PWM signal 48. That is, current supplied to the actuator 50 is provided by the driver 36. Accordingly, the current sensor 38 can be configured to sense an amount of current supplied by the driver 36 through connection 42.

The current sensor 38 can be any variety of sensor. For example, the current sensor 38 can include one or more series resistors, amplifiers, or the like. In another example, the current sensor 38 can be a virtual current sensor that uses other measured values to estimate a current. Any parameter related to a current supplied by the driver can be sensed and used to generate the current signal 46. The current sensed can, but need not be the exact current that is supplied to the actuator 50. That is, the current sensed can be a current that represents the current supplied to the actuator 50.

The processor 34 is configured to receive the current signal 46 from the current sensor 38. The processor 34 can be configured to limit a duty cycle of the PWM signal 40, and hence, a duty cycle of the PWM signal 48 in response to the sensed current 46. In an embodiment, a particular current over a threshold can damage or deteriorate components of the actuator 50. By limiting the duty cycle, an effective current supplied to the actuator 50 can be limited to reduce a change of damage, deterioration, or the like.

Similar to the PWM signal 48, the current sensed by current sensor 38 can be a single current signal, multiple current signals each associated with a different individual PWM signal of the PWM signal 48, or the like. Furthermore, although one or more PWM signals have been described as being generated by the controller 32, received by the actuator 50, or the like, other signal, connections, power supplies, or the like can be connected to the actuator. For example, the actuator 50 can receive a power supply for a sensor such as a speed sensor, a position sensor, or the like. The actuator 50 can provide sensed signals to the controller 32. Any signal, connection, or the like, beyond the PWM signal 48 can be coupled between the controller 32 and the actuator 50.

Moreover, the PWM signal 40 can, but need not be identical to the PWM signal 48 supplied to the actuator 50. For example, a single PWM signal 40 can be supplied to the driver 36 with a particular duty cycle. The driver 36 can be configured to generate multiple individual PWM signals of the PWM signal 48, such as different phases for driving the actuator. Each such signal can have the duty cycle substantially similar to the duty cycle of the PWM signal 40 from the processor 34.

Figure 3:
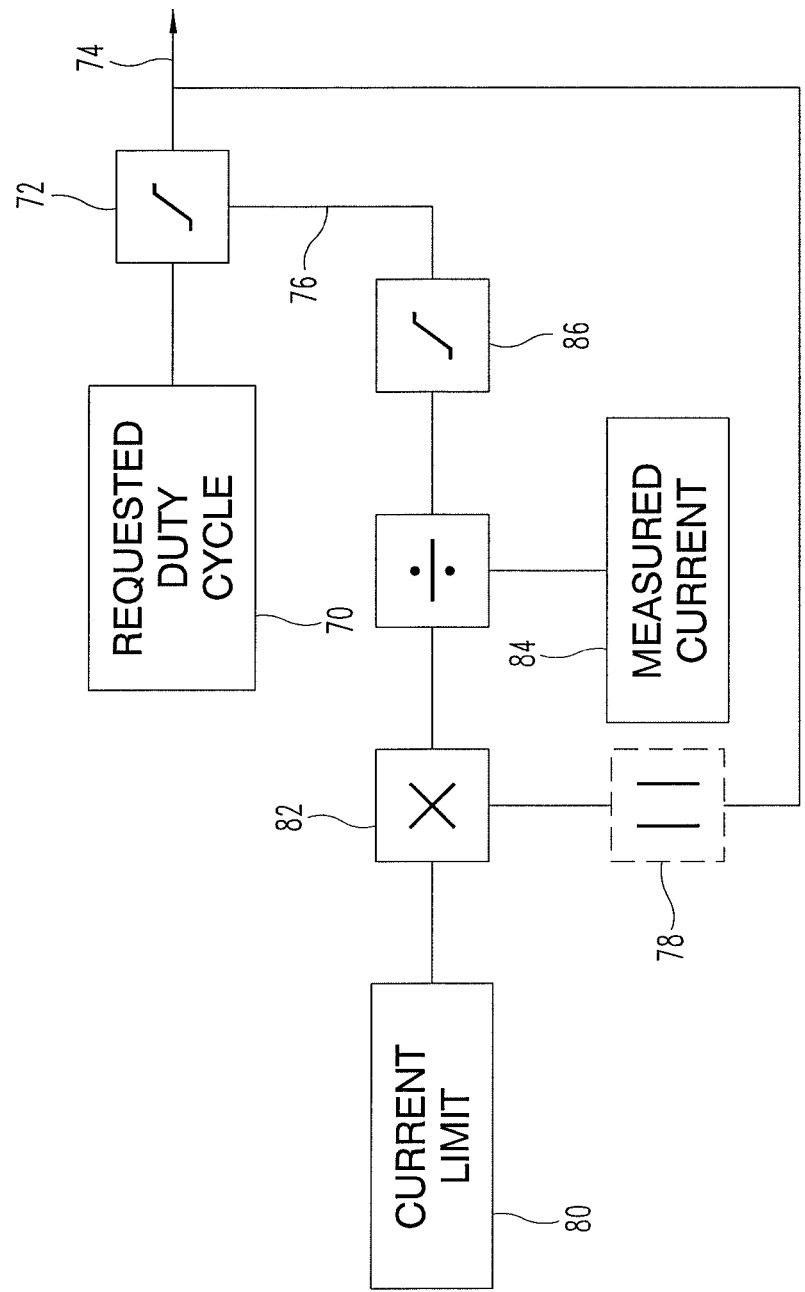
FIG. 3 is a block diagram of duty cycle limiting in an actuator control system according to another embodiment.

FIG. 3 is a block diagram of duty cycle limiting in an actuator control system according to another embodiment. In an embodiment, this diagram can represent logic within a controller described herein. A requested duty cycle 70 can be generated by particular sub-system of the controller associated with the actuator. For example, a particular state of an inlet of a turbine can be desired for current engine operating conditions. The requested duty cycle 70 can be generated to attempt to achieve the desired state.

However, with current operating conditions, the requested duty cycle 70 may cause damage, deterioration, or the like to an actuator. Accordingly, the requested duty cycle 70 can be limited by limiter 72 to generate a limited duty cycle 74. In particular, the requested duty cycle 70 can be limited by duty cycle limit 76.

In an embodiment, the requested duty cycle 70 can have a positive or negative polarity. Accordingly, the limiter 72 can be configured to limit a magnitude of the duty cycle in response to the duty cycle limit 76. However, in another embodiment, the duty cycle limit 76 can include positive and negative maximums, high and low limits, excluded ranges, or the like. Furthermore, in an embodiment, a single polarity duty cycle signal can be used. That is, the limits imposed by the limiter 72 can be set as desired in response to the duty cycle limit 76.

In an embodiment, a duty cycle of the PWM signal can be limited in response to a current supplied by the PWM signal, a requested duty cycle, and a current limit. For example, the requested duty cycle 70 can be limited in response to the present duty cycle 74, a current limit 80, and a measured current 84.

The measured current 84 can represent the current signal 46 described above. That is, the measured current 84 can represent a current used to drive an actuator. The product of the current limit 80 and the duty cycle 74 is divided by the measured current 84 to generate a duty cycle limit 76. For example, equation 1 represents the duty cycle limit calculation.

$$DutyCycleLimit = \frac{CurrentLimit \times DutyCycle}{MeasuredCurrent} \quad (1)$$

That is, the current limit 80 is multiplied by the duty cycle 74. In an embodiment, the current limit 80 can be multiplied by a magnitude of the duty cycle 74 as represented by magnitude operator 78. The product is divided by the measured current 84. In other words, a current limit can be converted into a duty cycle limit. In addition, a relationship between a present duty cycle and a sensed current can be used to convert a current limit into a duty cycle limit.

In an embodiment, the result can be limited by limiter 86. For example, the duty cycle limit can be limited to between about 10% and about 100%. In some circumstances, a division by a low sensed current, a low duty cycle, or the like could result in a lower duty cycle limit 76. Accordingly, a lower limit on the duty cycle limit can be established. In other circumstances, a particular duty cycle could substantially avoid damage and/or deterioration regardless of temperature, power supply voltages, or other operation conditions. Such a duty cycle could be used for the lower limit. Thus, even though the various parameters and measurements may result in a lower calculated duty cycle limit, a higher duty cycle limit can be used. Although particular examples have been given, other threshold limits can be used to limit the duty cycle limit.

In an embodiment, the controller can be configured to substantially continuously raise a limit on the duty cycle of the PWM signal. For example, a resistance of an actuator can decrease in certain conditions. For example, if a temperature of the actuator is relatively low, the resistance can also be relatively low. For a given duty cycle, if the resistance is lower, the current supplied can be greater and potentially meet the current limit 80.

However, as a system including the actuator operates, the temperature can increase, increasing the resistance of the actuator. Thus, for a given duty cycle, the current supplied and hence, the measured current 84 decreases. As the measured current 84 decreases, the duty cycle 76 increases, allowing the limited duty cycle 74 to correspondingly increase if it was limited by the limiter 72. Accordingly, the duty cycle limit can have an initial lower lever and, as temperature increases during operation, the duty cycle limit can substantially continuously increase.

Although the duty cycle 74 is illustrated as a generated signal, the duty cycle 74 used to multiply with the current limit 80 in forming the duty cycle limit 76 can be a measured signal. For example, similar to the current sensor described above, a duty cycle sensor can generate a signal representative of the duty cycle used to drive the actuator. This measured duty cycle can be used in the calculation of the duty cycle limit 76.

Figure 4:
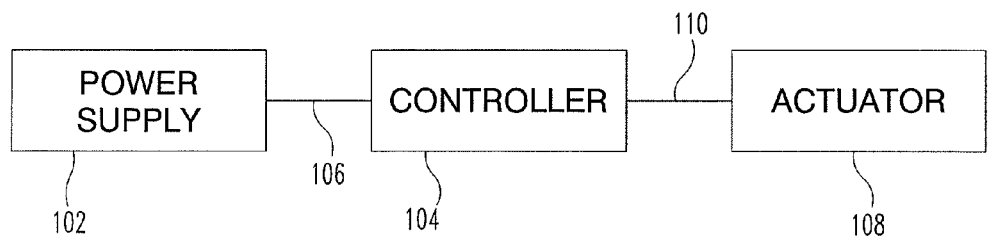
FIG. 4 is a block diagram of an actuator control system according to another embodiment.

FIG. 4 is a block diagram of an actuator control system according to another embodiment. In this embodiment, the actuator control system 100 includes a power supply 102, a controller 104, and an actuator 108. The controller 104 is coupled to the actuator 108 and is configured to provide a PWM signal 110 as described above. The controller 104 is configured to receive a voltage 106 from the power supply 102.

In different embodiments, the voltage 106 from the power supply 102 can be different. For example, in one embodiment, the voltage 106 can be about 12V. In another embodiment, the voltage can be about 24V.

Different actuators 108 can be designed to accommodate different voltage supplies. For example, one actuator can be designed to operate with a 12V PWM signal while another actuator can be designed to operate with a 24V PWM signal. Such actuators 108 can be different models which, when designing a system for multiple power supply voltages, can increase expenses due to parts tracking, inventory, or the like.

However, in an embodiment, the controller 104 can be configured to drive the actuator 108 even if the power supply 102 supplies different voltages 106. That is, a single actuator 108 with a given voltage rating can be used even though the power supply voltage 106 can result in a PWM signal 110 that exceeds the rated voltage. In particular, the controller 104 can be configured to limit a duty cycle of the PWM signal 110 in response to the power supply voltage 106.

In an embodiment a duty cycle limit can be dependent on the voltage 106. For example, the controller 104 can be configured to substantially limit a maximum of the duty cycle of the PWM signal 110 to a ratio of a base voltage to the voltage 106 of the power supply. Using 12V and 24V as examples, the base voltage can be 12V. If the voltage 106 is 24V, the duty cycle can be limited to about 12V:24V, or about 50%.

Accordingly, an actuator with a particular rated voltage, such as 12V, can be used in a system with a higher power supply voltage 106 of 24V. In an embodiment, the base voltage can be the rated voltage; however, in other embodiments, the base voltage can be smaller or larger, but still less than the power supply voltage 106 in particular applications. Although particular examples have been given, namely 12V and 24V, the voltages of the components, power supplies, or the like can be selected as desired.

Figure 5:
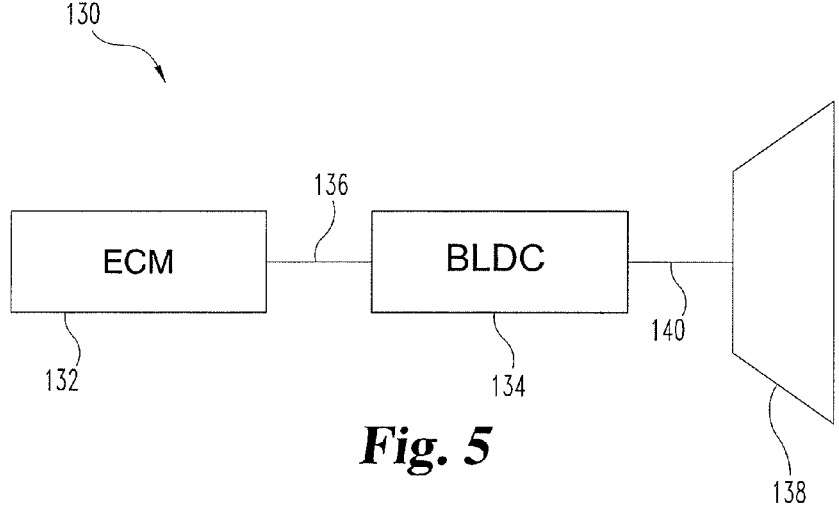
FIG. 5 is a block diagram of an engine system with an actuator control system according to another embodiment.

FIG. 5 is a block diagram of an engine system with an actuator control system according to another embodiment. In this embodiment, the engine system 130 includes an engine control module (ECM) 132. The ECM 132 can be configured to control various operations of the engine system 130. In particular, the ECM 132 can be configured to control an actuator associated with a turbine 138.

For example, the ECM 132 can be configured to drive a brushless direct current (BLDC) motor 134. The ECM 132 can be configured to generate a PWM signal 136 to drive the BLDC motor 134.

The BLDC motor 134 can be coupled to the turbine 138. For example, the turbine 138 can be a variable geometry turbine. A linkage 140 can connect the BLDC motor 134 to the turbine 138 such that the BLDC motor 134 can change the geometry of the particular turbine 138. In an embodiment, the BLDC motor 134 can be mounted on or otherwise integrated with the turbine 138. The ECM 132 can be configured to actuate the BLDC motor 134 as described above. In particular, the ECM 132 can be coupled to the BLDC motor 134 through a cable harness and configured to drive the actuator through the cable harness.

Although a single BLDC motor 134 has been illustrated, any number of actuators and corresponding parts of the turbine 138 can be controlled as described above. Moreover, any number of BLDC motors 134, other actuators, or the like can be controlled as described above.

Although a turbine 138 has been used as an example, in an embodiment, other components of the engine system 130 and components of a vehicle containing the engine system 130 can be actuated and controlled by the ECM 132 or other controller as described above. For example, throttles, exhaust gas recirculation valves, wastegates, electric power steering systems, or the like can be driven by the ECM 132 or similar controller.

Furthermore, although only an ECM 132, BLDC motor 134, and a turbine 138 have been illustrated as part of the engine system 130, other components can be present, but were omitted for ease of illustration. For example, engine blocks, compressors, exhaust systems, aftertreatment systems, or the like can be part of the engine system 130.

An embodiment includes a computer-readable medium storing computer-readable code that when executed on a computer, causes the computer to perform the various techniques described above.

Although particular sequences of operations have been described above, in other embodiments, the sequences can occur as desired.

Although particular embodiments have been described above, the scope of the following claims is not limited to these embodiments. Various modifications, changes, combinations, substitution of equivalents, or the like can be made within the scope of the following claims.

What is claimed is:

1. A system, comprising:
an actuator for actuating a component of an engine; and
a controller configured to drive the actuator with a pulse width modulated (PWM) signal in response to a requested duty cycle for the component;
wherein:
the controller is configured to limit the requested duty cycle of the PWM signal that drives the actuator in response to a current supplied by the PWM signal to drive the actuator, a present duty cycle, and a current limit associated with a threshold for damage or deterioration of the actuator, wherein a duty cycle limit is generated by dividing a product of the current limit and the present duty cycle by the current supplied by the PWM signal and the controller is further configured to limit the requested duty cycle of the PWM signal in response to the duty cycle limit.

2. The system of claim 1, wherein the controller is configured to limit the duty cycle limit.

3. A system, comprising:
an actuator for actuating a component of an engine, the actuator having a base voltage;
a controller configured to drive the actuator with a pulse width modulated (PWM) signal in response to a requested duty cycle for the component; and
a power supply configured to supply power to the controller;
wherein the controller is configured to limit the requested duty cycle of the PWM signal in response to the base voltage and a voltage of the power supply, the base voltage being less than the voltage of the power supply, wherein a duty cycle limit is generated by dividing the base voltage and the voltage of the power supply and the controller is further configured to limit the requested duty cycle of the PWM signal in response to the duty cycle limit.

4. The system of claim 3, wherein the controller is configured to substantially limit a maximum of the duty cycle of the PWM signal to a ratio of the base voltage of the actuator to the voltage of the power supply.

5. The system of claim 4, wherein the base voltage is a rated voltage of the actuator.

6. The system of claim 5, wherein the rated voltage is less than the voltage of the power supply.

7. A system, comprising:
a turbine;
an actuator coupled to the turbine and configured to actuate at least a part of the turbine;
an engine coupled to the turbine; and
an engine controller coupled to the engine and configured to control an operation of the engine;
wherein:
the engine controller is configured to drive the actuator to actuate the part of the turbine with a pulse width modulated (PWM) signal in response to a requested duty cycle for the part of the turbine; and
the controller is configured to limit the requested duty cycle of the PWM signal in response to a current supplied by the PWM signal to drive the actuator, a present duty cycle, and a current limit associated with a threshold for damage or deterioration of the actuator, wherein a duty cycle limit is generated by dividing a product of the current limit and the present duty cycle by the current supplied by the PWM signal and the controller is further configured to limit the requested duty cycle of the PWM signal in response to the duty cycle limit.

8. The system of claim 7, further comprising:
a cable harness coupled between the engine controller and the actuator;
wherein the engine controller is configured to drive the actuator through the cable harness.

9. A system, comprising:

an actuator for actuating a component associated with an engine; and a controller configured to drive the actuator with a pulse width modulated (PWM) signal in response to a requested duty cycle for the component;

wherein:

the controller is configured to limit the requested duty cycle of the PWM signal to a first limit in response to a current supplied by the PWM signal to drive the actuator, a present duty cycle, and a current limit associated with a threshold for damage or deterioration of the actuator, wherein a duty cycle limit is generated by dividing a product of the current limit and the present duty cycle by the current supplied by the PWM signal and the controller is further configured to limit the requested duty cycle of the PWM signal to the first limit in response to the duty cycle limit and to substantially continuously raise the first limit on the duty cycle of the PWM signal to a second limit in response to a decreasing resistance of the actuator.

10. A method, comprising:

driving an actuator that actuates a component associated with an engine with a pulse width modulated (PWM) signal in response to a requested duty cycle for the component;

sensing a current associated with driving the actuator;

combining the sensed current, a current limit associated with a threshold for damage or deterioration of the actuator, and a present duty cycle of the PWM signal to generate a duty cycle limit, wherein the combining includes dividing a product of the current limit and the present duty cycle by the current supplied by the PWM signal to generate the duty cycle limit; and limiting the requested duty cycle of the PWM signal with the duty cycle limit.

11. The method of claim 10, further comprising:

driving the actuator with a PWM signal having the limited requested duty cycle.

12. The method of claim 10, further comprising limiting the duty cycle limit.

* * * * *